P. ARCHACKI.
FIELD KITCHEN.
APPLICATION FILED SEPT. 6, 1918.

1,335,473.

Patented Mar. 30, 1920.

Witnesses
J. L. Wright

Inventor
P. Archacki
By Victor J. Evans
Attorney

P. ARCHACKI.
FIELD KITCHEN.
APPLICATION FILED SEPT. 6, 1918.
1,335,473.
Patented Mar. 30, 1920.
3 SHEETS—SHEET 2.
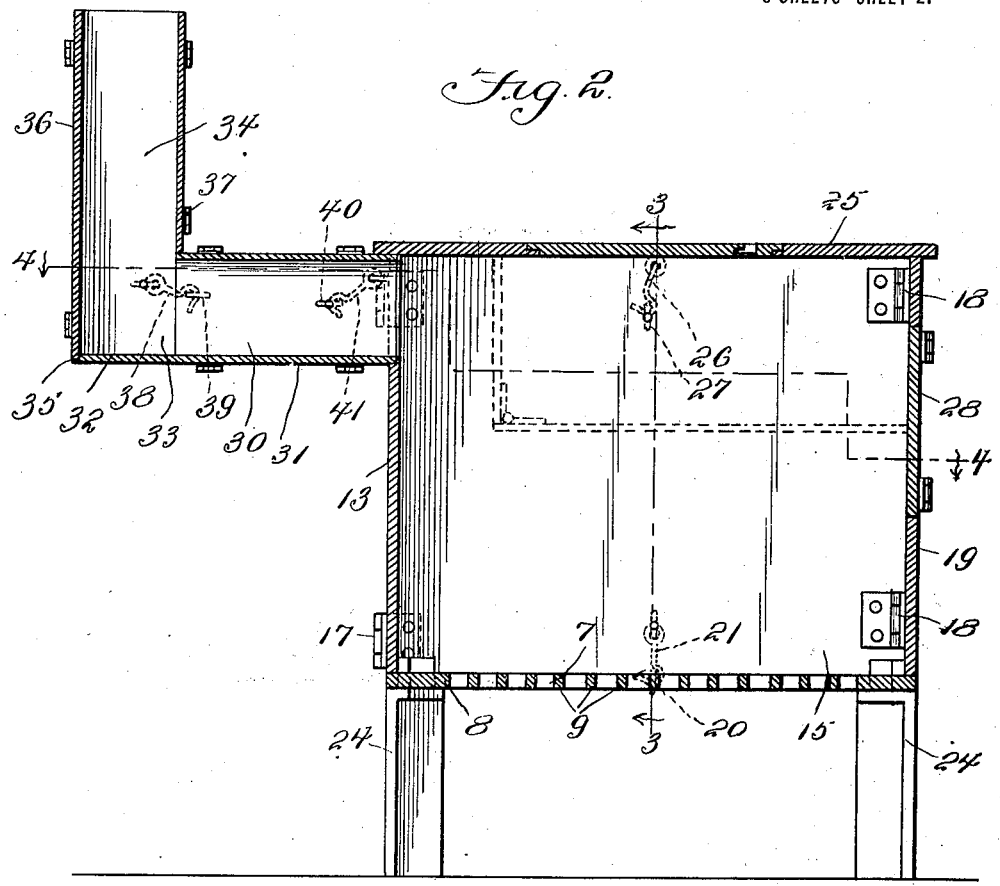
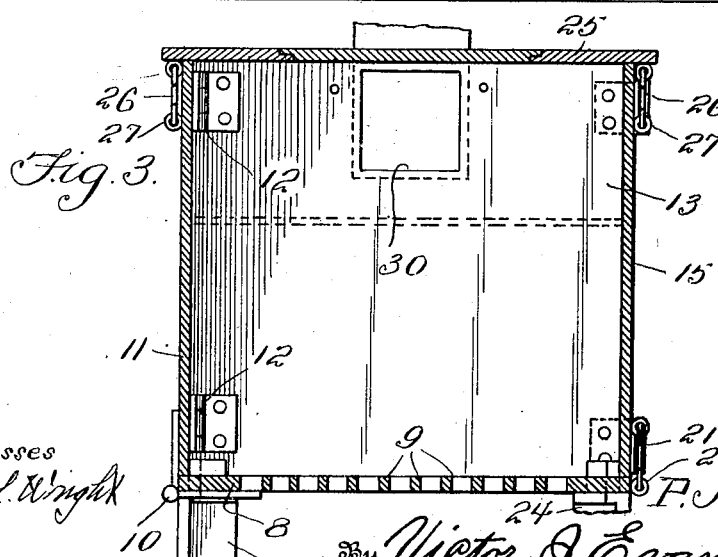

P. ARCHACKI.
FIELD KITCHEN.
APPLICATION FILED SEPT. 6, 1918.
1,335,473.
Patented Mar. 30, 1920.
3 SHEETS—SHEET 3.
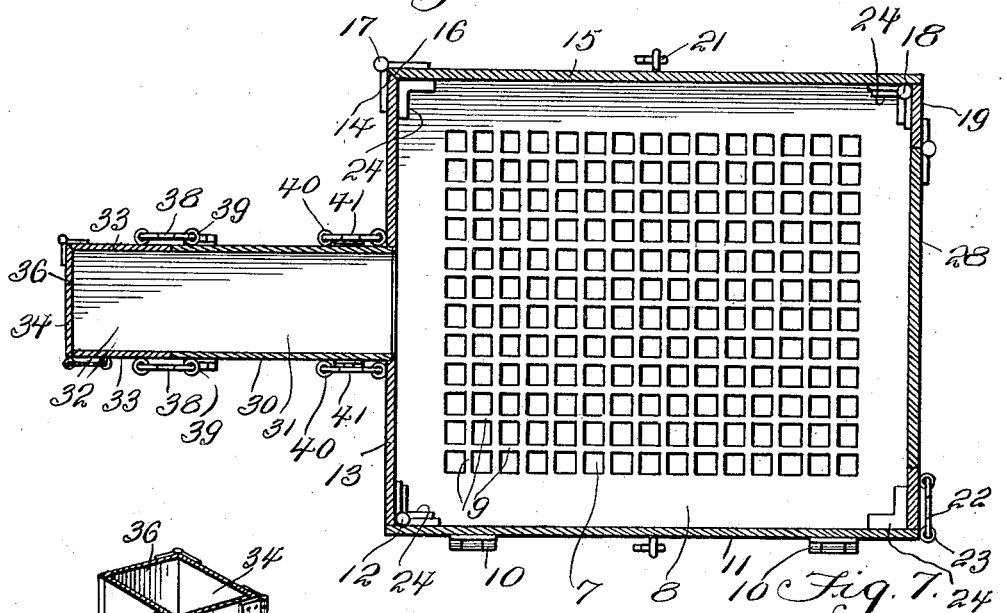
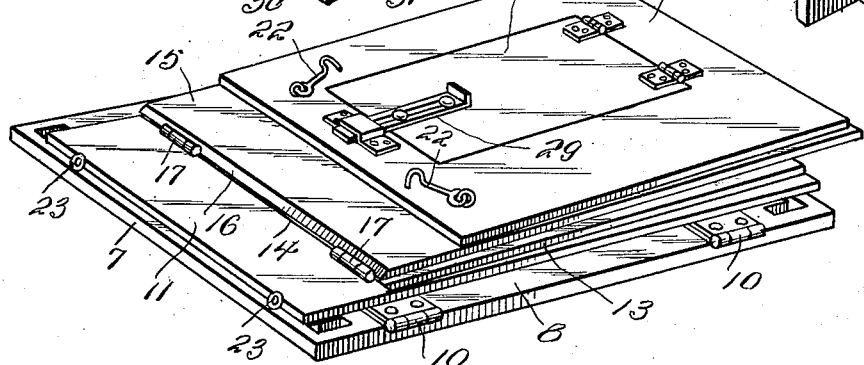
Witnesses
J. T. L. Wright
Inventor
P. Archacki
By Victor J. Evans
Attorney

UNITED STATES PATENT OFFICE.

PIOTR ARCHACKI, OF DETROIT, MICHIGAN.

FIELD-KITCHEN.

1,335,473.     Specification of Letters Patent.     Patented Mar. 30, 1920.

Application filed September 6, 1918. Serial No. 252,928.

*To all whom it may concern:*

Be it known that I, PIOTR ARCHACKI, a citizen of the United States, residing at Detroit, in the county of Wayne and State of Michigan, have invented new and useful Improvements in Field-Kitchens, of which the following is a specification.

This invention relates to stoves and particularly to a knock-down or separable field range which may be readily moved from place to place in a compact form and quickly assembled or disassembled.

The above objects, and others which will appear as the nature of the invention is better understood are accomplished by a comparatively simple and cheap construction, combination and operative arrangement of parts, a satisfactory embodiment of which being illustrated by the drawings.

In the drawings:

Fig. 2 is an approximately central vertical longitudinal sectional view through the same;

Fig. 3 is a transverse sectional view approximately on the line 3—3 of Fig. 2;

Fig. 4 is a horizontal sectional view approximately on the line 4—4 of Fig. 2; and Fig. 5 is a view showing the device in its folded condition.

Fig. 6 is a detail perspective view of the meeting ends of the horizontal and vertical sections of the stove pipe, the same being in section.

Fig. 7 is a detail perspective view of one of the removable legs.

Figure 1:
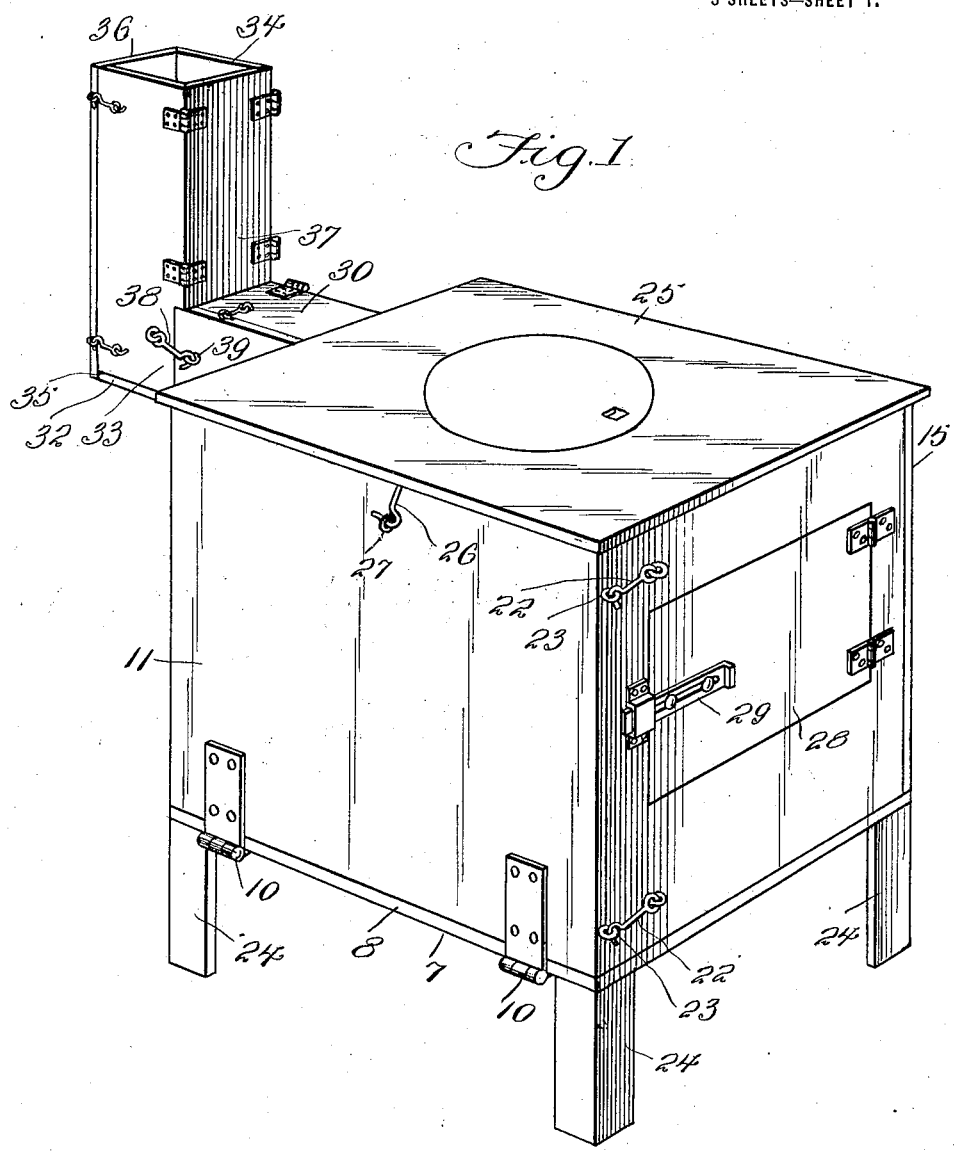
Figure 1 is a perspective view of the improvement in its set up position.

The base or bottom 7 of my improved foldable and portable field kitchen stove is in the nature of a grate, the same comprising a flat substantially rectangular or square plate in the nature of a frame 8 having integrally formed with the sides or ends thereof spaced bars 9 that provide the grate proper.

Hingedly secured to one of the edges of the frame 8, as indicated by the numerals 10 is one of the side members 11 of the stove. To one of the ends of the side 11, and at the inner corner of the said side is hingedly secured, as at 12 the rear end or back 13 of the stove. The back has its free edge, or its edge opposite that hingedly connected with the side 11 cut at an angle as indicated by the numeral 14. The second side of the stove is indicated by the numeral 15 and has one of its ends cut at an angle as at 16 and hingedly connected at the said angular end to the angle end 14 of the back 13, the hinges being indicated by the numeral 17. To the front end of the side 15, upon the inner face thereof is hingedly connected, as at 18 the front 19 of the stove, the latter adapted to swing inwardly over the base 9 in contact with the inner wall of the side 15.

The base 7, at its edge opposite that to which the side 11 is hingedly connected is formed with or has secured thereon an eye 20 designed to be engaged by a hook 21 that is loosely secured on the side 15.

The front 19 has loosely secured thereon hooks 22 designed to engage with eyes 23 on the outer edge of the side 11, and by the means above stated the sections comprising the body of the stove are effectively held together on the bottom and effectively locked to the latter.

The frame comprising the base or bottom 7 adjacent the corners thereof preferably is formed with openings near the corners of the said frame whereby to receive the reduced upper ends of removable legs 24.

The top of the stove is indicated by the numeral 25, and is provided, adjacent the ends thereof with loosely connected hooks 26 designed to engage in eyes 27 on the sides of the stove, whereby the said top is removably connected with the body of the stove.

The top may be provided with suitable openings for lids if desired and as illustrated by the drawings.

The front is provided with a substantially rectangular opening closed by a hinged door 28, suitable latching means 29 being provided between the door and the front. The door opening permits of the insertion of fuel into the fire box of the stove, and if desired, a suitable horizontal plate may be arranged in the stove, as indicated by the dotted lines forming the portion thereabove with an oven, the said partition being, of course, removable.

The stove is elevated above the ground and consequently proper draft is permitted the combustion chamber therein.

The rear or back of the stove, from the upper edge thereof is provided with a substantially rectangular cut-away portion or opening designed to receive the horizontal joint 30 of the smoke pipe. The sections of the smoke pipe are square or rectangular in cross section, the bottom plate or wall 31 of the horizontal joint extending a suitable distance beyond the outer end thereof forming a ledge 32. On this ledge rest the sides 33 of the vertical joint 34 of the smoke pipe. The outer edge of the ledge is contacted by the projecting portion 35 of the outer vertical wall 36 of the said vertical joint. The inner wall 37 of the vertical joint terminates a suitable distance above the ends of the sides, sufficiently to permit of the end of the said inner wall 37 resting on the top wall of the horizontal joint 30. The vertical joint has arranged thereon loosely connected hooks 38 designed to engage with eyes 39 in the sides of the horizontal joint. The horizontal joint is provided with additional eyes 40 that are adapted to be engaged by hooks 41 loosely arranged upon the back 13 at the opposite sides of the stove pipe opening. By this arrangement it will be noted that the smoke pipe may be securely connected with the body of the stove, and the sections thereof quickly assembled or disassembled.

In collapsing the stove the top is first removed from the sides. The hooks on the front, engaging with the eyes are brought out of such engagement, and in a like manner the hooks on the side 15 engaging with the base are also released. It is to be understood that the legs 24 are removed from the base and that the smoke pipe is released from the back of the stove and the sections thereof disconnected and collapsed. The front 19 is swung inwardly against the side 15. The side 15 is swung outwardly against the outer face of the back 13. The back 13 is swung inwardly against the side 11. Thereafter the base 7, or the folded sides and ends are swung upon the hinge connection between the side 11 and the base, bringing the base in contacting engagement with the outer face of the side 11. The top and the sections comprising the smoke pipe are arranged either over or under the folded sections comprising the body of the device, so that only a small package or bundle is presented for storage or for transportation.

Having thus described the invention, what is claimed as new is:—

The combination; a portable stove including a collapsible body having the back thereof provided with a rectangular smoke pipe opening and having loosely secured hooks at the opposite sides of the opening, a sectional stove pipe for the body comprising rectangular members, two of which are hinged to each other and also hinged to one of the remaining members; one of the last mentioned members being provided with spaced eyes and the other with hooks to engage in the eyes, said stove pipe including a horizontal and a vertical section, the horizontal section having one of its ends received in the pipe opening of the body and having eyes thereon to be engaged by the hooks carried by the body, said horizontal section having its bottom, at its outer end extended beyond its sides, the vertical section having its sides at the lower end of the said section notched upon their inner edges to contact with the outer edges of the sides of the horizontal section and to provide the front of the vertical section with a shoulder that rests on the top member of the horizontal section, the outer or front plate of the vertical member being projected below the sides thereof to contact with the end of the extension on the horizontal member, and connecting means comprising hooks and eyes between the vertical and horizontal sections for removably connecting said sections.

In testimony whereof I affix my signature.

PIOTR ARCHACKI.